(12) United States Patent
Wang et al.

(10) Patent No.: US 10,567,174 B2
(45) Date of Patent: Feb. 18, 2020

(54) BLOCKCHAIN DATA PROCESSING METHODS, APPARATUSES, PROCESSING DEVICES, AND SYSTEMS

(71) Applicant: Alibaba Group Holding Limited, George Town (KY)

(72) Inventors: Hushen Wang, Hangzhou (CN); Xuming Lu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/409,420

(22) Filed: May 10, 2019

(65) Prior Publication Data
US 2019/0349200 A1 Nov. 14, 2019

(30) Foreign Application Priority Data
May 10, 2018 (CN) .......................... 2018 1 0443383

(51) Int. Cl.
*H04L 29/06* (2006.01)
*H04L 9/32* (2006.01)

(52) U.S. Cl.
CPC .......... *H04L 9/3228* (2013.01); *H04L 9/3247* (2013.01); *H04L 63/0442* (2013.01); *H04L 2209/38* (2013.01); *H04L 2209/56* (2013.01)

(58) Field of Classification Search
None
See application file for complete search history.

(56) References Cited

U.S. PATENT DOCUMENTS

| 9,794,074 B2 | 10/2017 | Toll et al. |
| 2016/0283920 A1 | 9/2016 | Fisher et al. |
| 2016/0342989 A1 | 11/2016 | Davis |
| 2017/0111175 A1 | 4/2017 | Oberhauser et al. |
| 2017/0132625 A1 | 5/2017 | Kennedy |
| 2017/0132626 A1 | 5/2017 | Kennedy |
| 2017/0155515 A1* | 6/2017 | Androulaki ............ G06F 21/64 |
| 2017/0236123 A1 | 8/2017 | Ali et al. |
| 2017/0243177 A1* | 8/2017 | Johnsrud .............. G06Q 20/389 |
| 2017/0257358 A1* | 9/2017 | Ebrahimi .............. H04L 9/3247 |
| 2017/0353311 A1* | 12/2017 | Schukai ................ H04L 9/0618 |

(Continued)

FOREIGN PATENT DOCUMENTS

| CN | 106789041 | 5/2017 |
| CN | 107453865 | 12/2017 |

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Maung T Lwin
(74) *Attorney, Agent, or Firm* — Fish & Richardson P.C.

(57) ABSTRACT

This specification describes techniques for securing blockchain transactions. One example method includes determining temporary identity information associated with a transaction participant, wherein the transaction participant participates in a transaction in a blockchain; performing an identity signature for the transaction by using the determined temporary identity information to obtain blockchain data; and in response to performing the identity signature, submitting the blockchain data to the blockchain for storage.

20 Claims, 6 Drawing Sheets

(56) References Cited

U.S. PATENT DOCUMENTS

| | | | |
|---|---|---|---|
| 2018/0012311 A1 | 1/2018 | Small et al. | |
| 2018/0117446 A1* | 5/2018 | Tran | A61B 5/0022 |
| 2018/0232526 A1* | 8/2018 | Reid | H04L 9/3239 |
| 2018/0248699 A1* | 8/2018 | Andrade | H04L 9/3239 |
| 2019/0020480 A1* | 1/2019 | Camenisch | H04L 9/3221 |
| 2019/0035018 A1* | 1/2019 | Nolan | G06Q 40/04 |
| 2019/0080402 A1* | 3/2019 | Molinari | G06Q 20/06 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/US2019/031590, dated Aug. 2, 2019, 6 pages.

\* cited by examiner

BLOCKCHAIN DATA PROCESSING METHODS, APPARATUSES, PROCESSING DEVICES, AND SYSTEMS

CROSS-REFERENCE TO RELATED APPLICATIONS

This application claims priority to Chinese Patent Application No. 201810443383.8, filed on May 10, 2018, which is hereby incorporated by reference in its entirety.

TECHNICAL FIELD

Solutions in implementations of the present specification relate to the field of computer data processing technologies, and in particular, to blockchain data processing methods, apparatuses, processing devices, and systems.

BACKGROUND

With the rapid development of the Internet, various types of data explosively emerge and grow. Because a blockchain features decentralization, tamper-resistance, distribution, etc., the blockchain technology is currently focused and studied in many technical fields.

In a blockchain application, both parties involved can offline agree on contract content or contract execution, and then store related data in a blockchain. In some blockchain applications, some transaction data in a blockchain can be viewed and analyzed by another node, for example, business activities of a member are analyzed based on the number of transactions submitted to the blockchain by the member within a time period, transaction types, and transaction participants. Apparently, the transaction data can be maliciously used in this way. Therefore, a solution that can more effectively ensure information security of transaction participants is urgently needed in a blockchain data service.

SUMMARY

Implementations of the present specification are intended to provide blockchain data processing methods, apparatuses, processing devices, and systems, each transaction participant can perform identity signature for a related operation in a transaction by using a temporary identity instead of a real identity, and association between a real identity of a transaction participant and the transaction in a blockchain can be removed, thereby effectively ensuring security of the real identity of the transaction participant, improving security of blockchain transaction data, and alleviating association between transactions.

The blockchain data processing methods, the apparatuses, the processing devices, and the systems provided in the implementations of the present specification are implemented in the following ways:

A blockchain data processing method is provided, where the method includes: determining temporary identity information of a transaction participant in a blockchain; and performing identity signature for a transaction by using the temporary identity information, to generate blockchain data of the transaction participant.

A blockchain data processing apparatus is provided, where the apparatus includes: a temporary identity determining module, configured to determine temporary identity information of a transaction participant in a blockchain; and a temporary identity signature module, configured to perform identity signature for a transaction by using the temporary identity information, to generate blockchain data of the transaction participant.

A blockchain data processing device is provided. The processing device includes a processor and a memory configured to store a processor executable instruction, and when executing the instruction, the processor performs the following steps: determining temporary identity information of a transaction participant in a blockchain; and performing identity signature for a transaction by using the temporary identity information, to generate blockchain data of the transaction participant.

A blockchain system including a blockchain terminal device and a blockchain node server is provided. The blockchain terminal device includes at least one processor and a memory configured to store a processor executable instruction, and when executing the instruction, the processor of the blockchain terminal device performs the steps in any method involved in the implementations of the present specification. The blockchain node server is configured to store blockchain data generated based on temporary identity information.

According to the blockchain data processing methods, the apparatuses, the processing devices, and the systems provided in the implementations of the present specification, each transaction participant can perform identity signature for a related operation in a transaction by using a temporary identity instead of a real identity, and association between a real identity of a transaction participant and a transaction in a blockchain is removed, so that a transaction is not associated with a real identity. In addition, identity signature for a transaction is performed by using a temporary identity, so that association between transactions can be effectively alleviated, big data analytics can be prevented from being performed on a ledger, and security of blockchain transaction data can be improved.

BRIEF DESCRIPTION OF DRAWINGS

To describe technical solutions in the implementations of the present specification or in the existing technology more clearly, the following briefly describes the accompanying drawings needed for describing the implementations or the existing technology. Apparently, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

To make a person skilled in the art better understand the technical solutions in the present specification, the following clearly and comprehensively describes the technical solutions in the implementations of the present specification with reference to the accompanying drawings in the implementations of the present specification. Apparently, the described implementations are merely some rather than all of the implementations of the present specification. All other implementations obtained by a person of ordinary skill in the art based on one or more implementations of the present specification without creative efforts shall fall within the protection scope of the implementations of the present specification.

The blockchain technology (BT for short), is also referred to as a distributed ledger technology, and is an Internet database technology. The blockchain technology features decentralization, transparency, tamper-resistance of data, etc. Currently, the blockchain technology has been applied to various fields in economy and society, for example, financial services, supply chain management, culture and entertainment, real estate, medical care, and electronic commerce, in addition to digital currencies. A plurality of individual users, user groups, or institutions in a blockchain can create a consortium blockchain or a private blockchain based on the features of the blockchain technology, and join the blockchain as members. Transaction data between members can be stored in a blockchain. For example, offchain signed contract content can be stored in a blockchain.

It is worthwhile to note that offchain and onchain in the implementations of the present specification mainly mean that whether a data operation is performed on a blockchain. For example, operations that are not performed on a blockchain such as negotiating to sign a contract by users offline, performing identity authentication by an authentication institution, and issuing a certificate can be offchain-related operations, and submission of a public key or certificate to a blockchain, verification by a blockchain node, data storage, etc. can be onchain-related operations. For example, submitting data to a blockchain for storage can be referred to as publishing to a blockchain.

Figure 1:
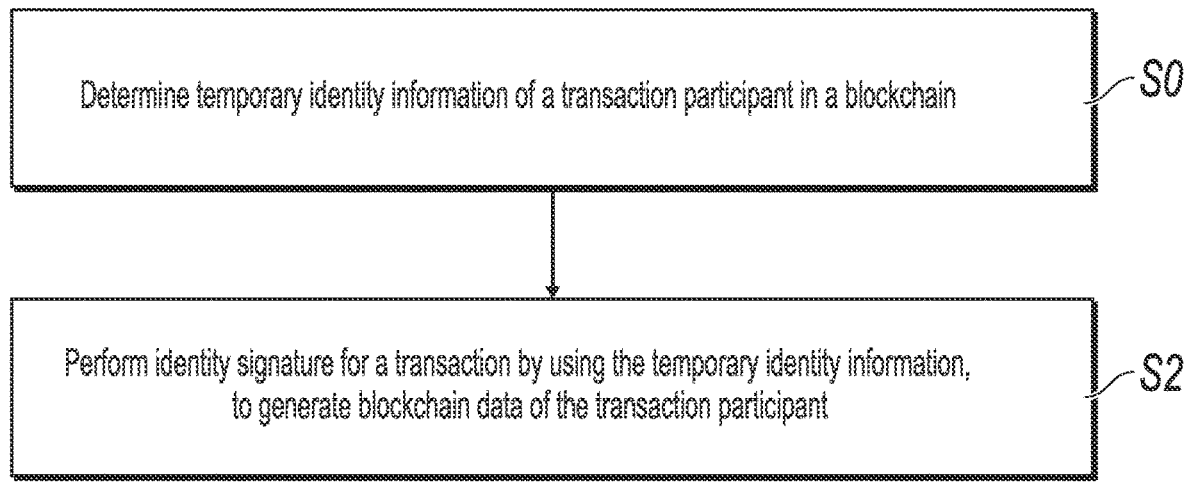
FIG. 1 is a schematic diagram illustrating a processing process in an implementation of a method, according to the present specification.

A conventional contract is usually recorded on paper after agreement is reached between contract participants through negotiation and discussion. A contract in the implementations of the present specification can be stored and recorded in a blockchain in a digital or another computer data storage form (for example, a quantum computer). The contract in the implementations of the present specification can include contract creation and contract execution. A transaction in the implementations of the present specification can include data operations related to processing of a contract. For example, submitting data generated during contract creation to a blockchain can be considered as a transaction, and submitting data generated during update of contract content can be considered as a new transaction. Certainly, a transaction can further include other blockchain data operations. Creation can mean that one or more contract participants or a third party formulates a standard form contract in advance, and can predetermine some necessary rights/obligations. Specific content of the standard form contract can be set and determined based on cooperation demands of participants. After the standard form contract is determined, the standard form contract can be stored in a blockchain after being processed by using a temporary key. Data corresponding to the standard form contract can be referred to as creation data. If the contract participants fill, modify, update, etc. the contract content based on the standard form contract to generate a new contract, or the contract participants confirm and sign the content to enable the contract to take effect, it can be referred to as contract execution. For example, contract participants A and B offline agree on an execution process of target contract T_C (a pre-created standard form contract) and generate a new contract that includes new contract content. Content of the new contract can be stored in a blockchain after identity signature is performed by using temporary identity information. During contract creation and contract execution in solutions in one or more implementations of the present specification, a blockchain node can perform identity signature by using temporary identity information, to generate blockchain data. FIG. 1 is a schematic diagram illustrating a process in an implementation of a blockchain data processing method, according to the present specification. As shown in FIG. 1, the method can include the following steps.

S0. Determine temporary identity information of a transaction participant in a blockchain.

S2. Perform identity signature for a transaction by using the temporary identity information, to generate blockchain data of the transaction participant.

Temporary identity information can usually be generated by a transaction participant, and different transaction participants can independently generate respective temporary identity information. Certainly, in another implementation solution, temporary identity information of all or some of transaction participants can be generated by a specified processing device, and then is distributed to the corresponding transaction participants based on a specific rule. The transaction participant usually is a participant involved in a transaction, for example, participants A and B involved in transaction content. In the present implementation, the transaction participants can further include other agreed participants such as a third party, a guarantor, and a regulator that are not involved in the transaction service content. There can be a plurality of transaction forms for contract creation (formulation) or execution. For example, same contract participants can create different contracts. For example, contract participants A and B can create contract T_C1, and can further create contract T_C2. The same participant can create different contracts with different cooperators. For example, contract participants A and B create contract T_C3, and contract participants A and D can create contract T_C4.

In some implementations of the present specification, identity signature for a transaction is involved. For example, signature can be performed by using temporary identity information during determination, modification, etc. of contract content. In an application scenario of the blockchain data processing method in the present implementation, the temporary identity information can be generated by using an asymmetric encryption algorithm. For example, a public key and a private key of the temporary identity information can be generated after real identity information of the transaction participant and a random number are processed. Therefore, in an implementation of the method provided in the present specification, the temporary identity information includes data information generated after the real identity information of the transaction participant is processed based on the asymmetric encryption algorithm.

Unlike a symmetric encryption algorithm, two keys, which are referred to as a public key and a private key, are needed in the asymmetric encryption algorithm. The public key and the private key are paired. If the public key is used to encrypt data, decryption can be performed by using only the corresponding private key. If the private key is used to encrypt data, decryption can be performed by using only the corresponding public key. In some implementation scenarios of the present specification, the asymmetric encryption algorithm can include RSA, Elgamal, knapsack algorithm, Rabin, D-H, ECC (Elliptic Curve Cryptography), etc.

In the present implementation, identity signature is performed by using the public key generated by using the asymmetric encryption algorithm and the temporary identity information of the transaction participant. The represented temporary identity information is random, and a real identity cannot be obtained in reverse. After the temporary identity information is stored in the blockchain, another non-transaction participant (other than an agreed party or a party with a decryption key) cannot learn of the real identity of the transaction participant. As such, the transaction is not associated with the real identity, and security of the real identity information of the user is greatly ensured.

Figure 2:
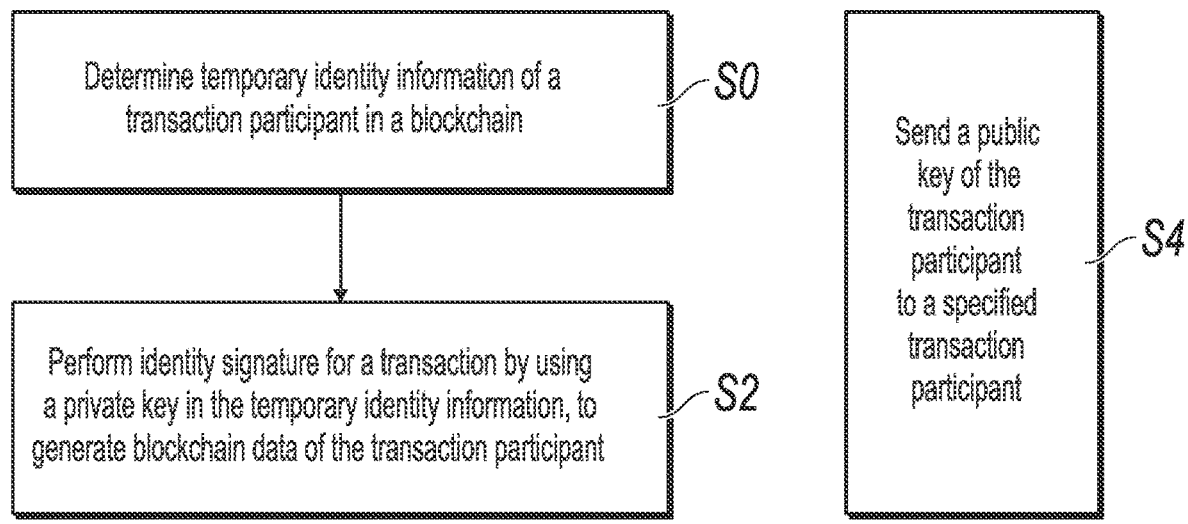
FIG. 2 is a schematic diagram illustrating another processing process in an implementation of a method, according to the present specification.

The transaction is processed by using the temporary identity information, and the generated blockchain data can be stored in the blockchain. For example, contract participants A and B respectively use temporary identities instead of real identities for agreed target contract T_C1. As such, the participants of target contract T_C1 become 17djfdk549sdflcjsdf8jkhkk9uj9ju and o8jhld89o8njdanv8dj7dp9eq1k1d8ka. Public keys of the temporary identities can be sent to a specified transaction participant, for example, A sends the public key to B that signs the contract. Certainly, the specified transaction participant can further include another agreed participant. Signature can be performed by using a private key of A, to prove that the temporary identity corresponds to real transaction participant A. Therefore, in another implementation of the method, as shown in FIG. 2, the method can further include the following step.

S4. Send a public key of the transaction participant to a specified transaction participant. Correspondingly, the performing identity signature for a transaction by using the temporary identity information can include the following: performing identity signature for the transaction by using a private key of the transaction participant.

The transaction participant is a transaction participant for current processing. For example, transaction participant A can send a public key to a specified transaction participant after generating temporary identity information, and transaction participant B can send a public key to a specified transaction participant after generating temporary identity information. The temporary identity information in the present specification can be updated for different transactions or transaction participants. The transaction participant usually uses one piece of temporary identity information in one transaction (the temporary identity information is replaced for each transaction), so that association between the transaction and the real identity can be more effectively alleviated, and security of the blockchain data can be further improved. For example, in some implementation scenarios of the present specification, contract participant A can sign a target contract by using the temporary identity information. For example, contract participant A uses different temporary identity information when processing a different target contract each time. Certainly, one piece of temporary identity information can be used for a plurality of times in another implementation. For example, the temporary identity information of contract participant A can be used to process data only in three contracts, and new temporary identity information is needed for processing the fourth contract. Alternatively, in another implementation, a replacement method of the temporary identity information can be set based on a contract participant. For example, identity signature is performed for a plurality of contracts between contract participant A and contract participant B by using the same temporary identity information. If new contract participant C is involved, in other words, contract participants include A, B, and C, contract participant A can perform identity signature by using new temporary identity information, or new temporary identity information is used for a contract signed by contract participant A and contract participant C. Likewise, contract participant B or C can use the same temporary identity information replacement policy with reference to the method used by contract participant A. Therefore, in another implementation of the method in the present specification, the method further includes the following step.

S02. The temporary identity information is updated based on at least one of different transaction participants and different transactions.

New temporary identity information can be generated for a change of the contract participant or for different transaction content. For example, contract participant A can perform identity signature by using different temporary identity information when signing different contracts with contract participant B, and contract participant A separately uses different temporary identity information for B and C when a contract signed by contract participants A and B is the same as a contract signed by contract participants A and C. In addition, different transactions can include different contract content, and can also include different contract signing time. For example, when a contract participant and contract content remain unchanged, the temporary identity information can be updated when contract data processing is performed at different moments or different time periods. As such, in an implementation scenario, a temporary identity is changed for different transaction participants or for each transaction, so that transactions in the blockchain are difficult to be associated with each other, unauthorized, non-agreed, or other malicious data analysis can be effectively prevented from being performed on blockchain ledger data, and security of the blockchain data can be effectively improved.

In another implementation, the temporary identity information can be periodically replaced based on a predetermined cycle. For example, a temporary key pair of each contract participant is replaced once a day. Replacement cycles can be uniformly predetermined, or different replacement frequencies can be set based on access (for example, a weight, identity of party A or party B, credit rank, and stock rights), etc. of a contract participant. For example, contract participant A is an important asset manager, and a temporary key pair of contract participant A is replaced once a day, and temporary identity information of cooperators B and C of contract participant A is replaced once a week. Therefore, in another implementation of the method in the present specification, the method further includes the following step.

S04. The temporary identity information is updated based on a predetermined replacement cycle.

In an example, a temporary identity information update policy based on the replacement cycle and a temporary identity information update policy based on the rights of the contract participant are both used. It can be set that the same replacement cycle is set for contract participants with the same rights, or different replacement cycles are set for contract participants with the same rights. For example, party A replaces temporary identity information once a day, party B replaces temporary identity information once a week, and party C replaces temporary identity information every three days.

In some implementations of the present specification, updated key information can still be stored in a blockchain node.

In the present implementation of the present specification, data information is processed by using a temporary identity before being uploaded to the blockchain for storage, so that association between transactions can be effectively removed, a transaction is difficult to be associated with a real identity, and storage security of the blockchain data can be improved.

Figure 3:
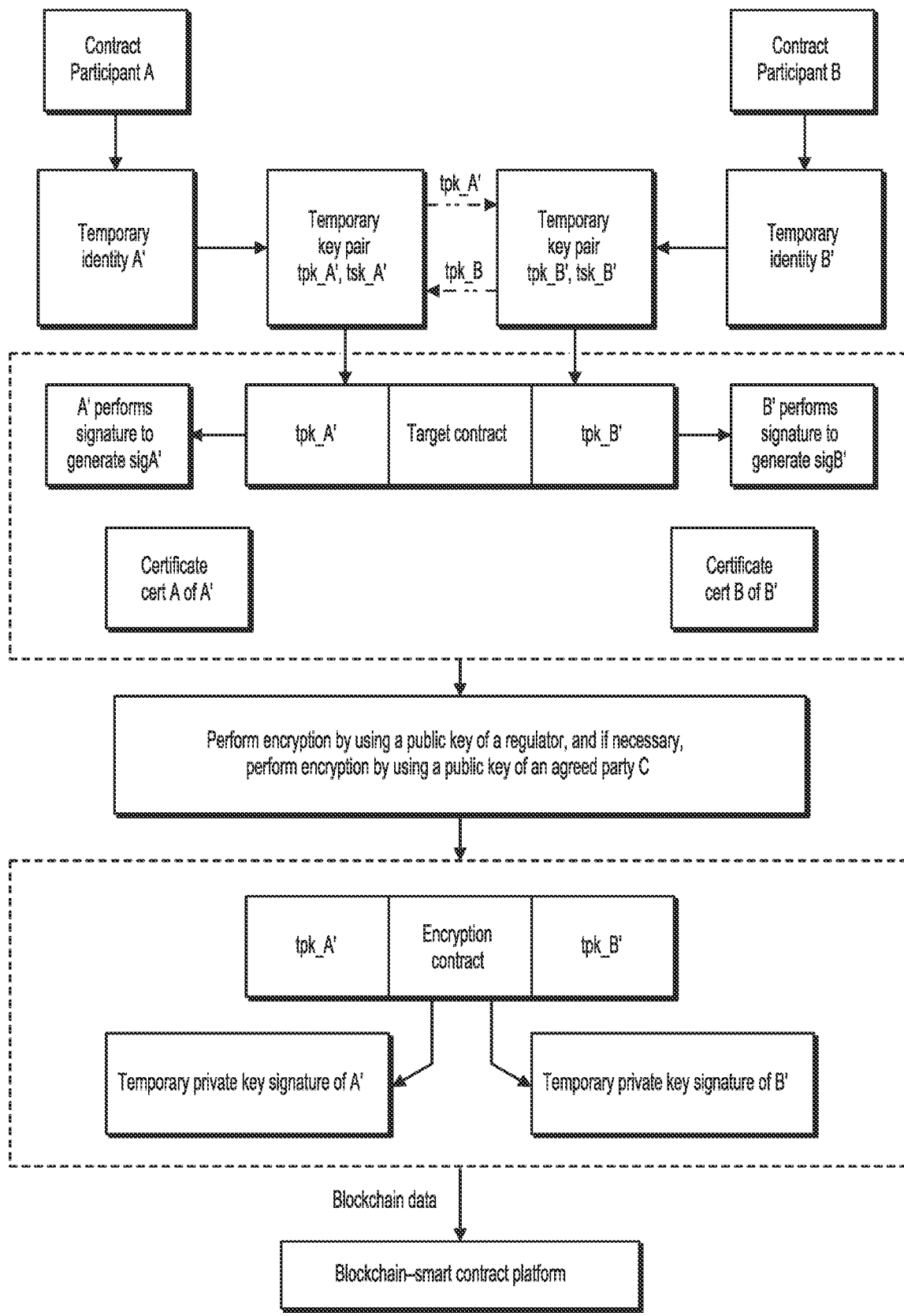
FIG. 3 is a schematic diagram illustrating an implementation scenario of a blockchain data processing method, according to the present specification.

The following describes the solution in the present implementation of the present specification by using an application scenario of processing another specific blockchain transaction in a contract as an example. FIG. 3 is a schematic diagram illustrating an implementation scenario of the blockchain data processing method, according to the present specification. Although operation steps of a method or a structure of an apparatus shown in the following implementations or the accompanying drawings are or is provided in the present specification, the method or the apparatus can include more or fewer operation steps after some operation steps are combined or module units based on conventional or noncreative efforts. An execution sequence of steps between which there is no logical causal relationship or a module structure of the apparatus is not limited to an execution sequence or a module structure shown in the implementations of the present specification or the accompanying drawings. When applied to an actual apparatus, server, or terminal device product application, the method or the module structure can be performed sequentially or in parallel based on the method or the module structure shown in the implementations or the accompanying drawings (for example, an environment of parallel processors or multithreaded processing, or even an implementation environment including distributed processing and server clustering).

A transaction can include creation of a standard form contract previously described, can also include signing and confirmation of a formal contract, and can subsequently further include contract execution. Certainly, descriptions in the following implementation constitute no limitation on another technical solution that can be obtained through expansion based on the present specification. For example, in another implementation scenario, in a broader sense, the transaction can further include a memo, a contract, a regulation, a statement, an announcement, etc. that need to be stored in a blockchain by one, two, or a plurality of parties, to update blockchain node data. A specific application scenario is shown in FIG. 3. Assume that a target contract involves contract participants A and B. As members of a consortium blockchain, A and B respectively hold corresponding certificates, and real identity information of A and B is A and B respectively. The certificates can be used to prove that A and B are authorized members of the blockchain, and A and B can create, execute, etc. a contract in the blockchain. It is worthwhile to note that in the present implementation of the present specification and the following application scenario, temporary identity information is used to hide real identity information of a transaction participant, and to remove association between transactions. A temporary key involved in a transaction in the present implementation or application scenario is mainly used to encrypt or sign transaction content. The transaction content can include temporary identity information. For example, if A does not use a temporary identity, after signature is performed by using a transaction private key, B can verify, by using a transaction public key, that the transaction comes from real A. If A uses temporary identity A', and performs signature by using a transaction private key, B can verify, by using a transaction public key, that the transaction comes from real authorized user A'. However, a real identity of A' cannot be learned, and there is no association between A' and the current transaction. Certainly, in another implementation of the present specification, a transaction can be encrypted or signed by directly using the temporary identity information as a temporary key. In an application scenario, both A and B can independently generate respective temporary identity information A 'and B', to respectively replace A and B, and then can independently generate respective temporary key pairs (tpk_A', tsk_A') and (tpk_B', tsk_B'). Temporary public keys of the both parties can be used to transmit data by using an established end-to-end encryption channel, for example, an end-to-end encryption channel based on the Secure Sockets Layer (SSL) protocol. As such, data transmission security can be further improved. Certainly, the sending a public key of the transaction participant to a specified transaction participant can include the following: transmitting data by using the established end-to-end encryption channel. To satisfy end-to-end offline communications demands of two users in the blockchain, the users (including a contract participant) usually need to mutually verify identities, and can communicate with the blockchain, to query the identities of each other by using the blockchain, and verify whether the users are authorized blockchain users. A specific process can include the following:

(1) Users A and B can register entity information and digital identities with a blockchain platform in a form of a smart contract or a non-smart contract by using a blockchain registration authority. The blockchain platform verifies a signature of the registration authority. After the verification succeeds, the entity information and the digital identities of A and B are stored in the blockchain. The digital identity can include a public key, a private key, etc. of a user. The entity information can include information such as a name and an ID card of the user.

(2) User A' and user B' establish an encryption channel. A' and B' can mutually send summaries of the digital identities of each other to the blockchain platform. After identifying that A' and B' are authorized users, the platform returns an acknowledgement message to A and B. Otherwise, a declination message is returned, and communication between A' and B' stops.

(3) To confirm the identity of B', A' can obtain query authorization (namely, a signature for a query request of A) from B', and submit a query request to the blockchain. Likewise, B' can submit a query for A' by performing the present step.

(4) The blockchain platform verifies the queries and authorization signatures of A' and B', and separately sends identity authentication information of A' and B' to A' and B' after identifying that A' and B' are authorized blockchain users. If A' or B' is not a blockchain user, a failure message is returned, and communication between A' and B' stops.

(5) After verifying the entity information of each other, A' and B' establish an encryption channel by using the digital identities, and exchange messages, for example, exchange temporary public keys.

After mutually sending the temporary public keys, A' and B' can respectively sign contract content of a target contract (tpk_A', tpk_B') by using respective private keys, to generate data that are signed by using the respective private keys. The data can be collectively referred to as first signature data here. Similarly, signature for the contract content of the target contract can also be referred to as signature for the target contract. For example, A' can sign the target contract (tpk_A', tpk_B') by using the private key tsk_A', to generate first signature data sigA' of A, and B' can sign the target contract (tpk_A', tpk_B') by using the private key tsk_B', to generate first signature data sigB' of B. The first signature data can be mutually sent, for example, A' sends sigA' to B'.

In some implementation application scenarios, a contract transaction can be regulated by a regulator, and the regulator can view, verify, examine, or block a contract, and regulate an illegal act based on the contract. Therefore, in an implementation scenario of the present implementation, related information of the target contract can be encrypted by using a regulation key of the regulator. In another implementation of the method, the method can further include the following step.

S6. Encrypt a private key of the transaction participant by using a public key in regulation keys corresponding to a regulator, and transmit encrypted information to the corresponding regulator.

In an implementation scenario of the present implementation, the regulation key of the regulator can be a public key in the asymmetric encryption algorithm. Certainly, in another implementation of the present specification, the regulation key can be generated by using another encryption algorithm. In the present implementation, the regulator can encrypt the private key of the transaction participant by using the public key of the regulator, and then the encrypted information is transmitted to the regulator. The private key of the transaction participant is encrypted by using the public key in the regulation keys corresponding to the regulator, and the encrypted information is transmitted to the corresponding regulator. The regulator can learn of the real identity information of the transaction participant through decryption by using a decryption key, for example, a private key, corresponding to the regulator, to regulate the transaction. Transmitting the encrypted information to the corresponding regulator can include the following: The private key encrypted by using the public key of the regulator is sent to the regulator, and the private key is stored in the blockchain after the regulator learns that the private key is encrypted, and the regulator obtains the private key from the blockchain.

The generated blockchain data can be submitted to the blockchain for storage. Certainly, a smart contract platform can be further set in the blockchain. The blockchain data can be submitted to the smart contract platform, and is managed by the smart contract platform.

The previous implementation can be performed by a processing device that can include a device communicating with a blockchain node server of the transaction participant, can be performed by a blockchain node server, or can be implemented by a blockchain client device. For example, the client device creates and executes a contract by using temporary identity information, and blockchain data stored in the blockchain node server is data obtained by performing processing by using the temporary identity information.

The implementations of the method in the present specification are described in a progressive way. For same or similar parts of the implementations, references can be made to the implementations. Each implementation focuses on a difference from the other implementations. For related parts, reference can be made to partial descriptions in the method implementations.

Figure 4:
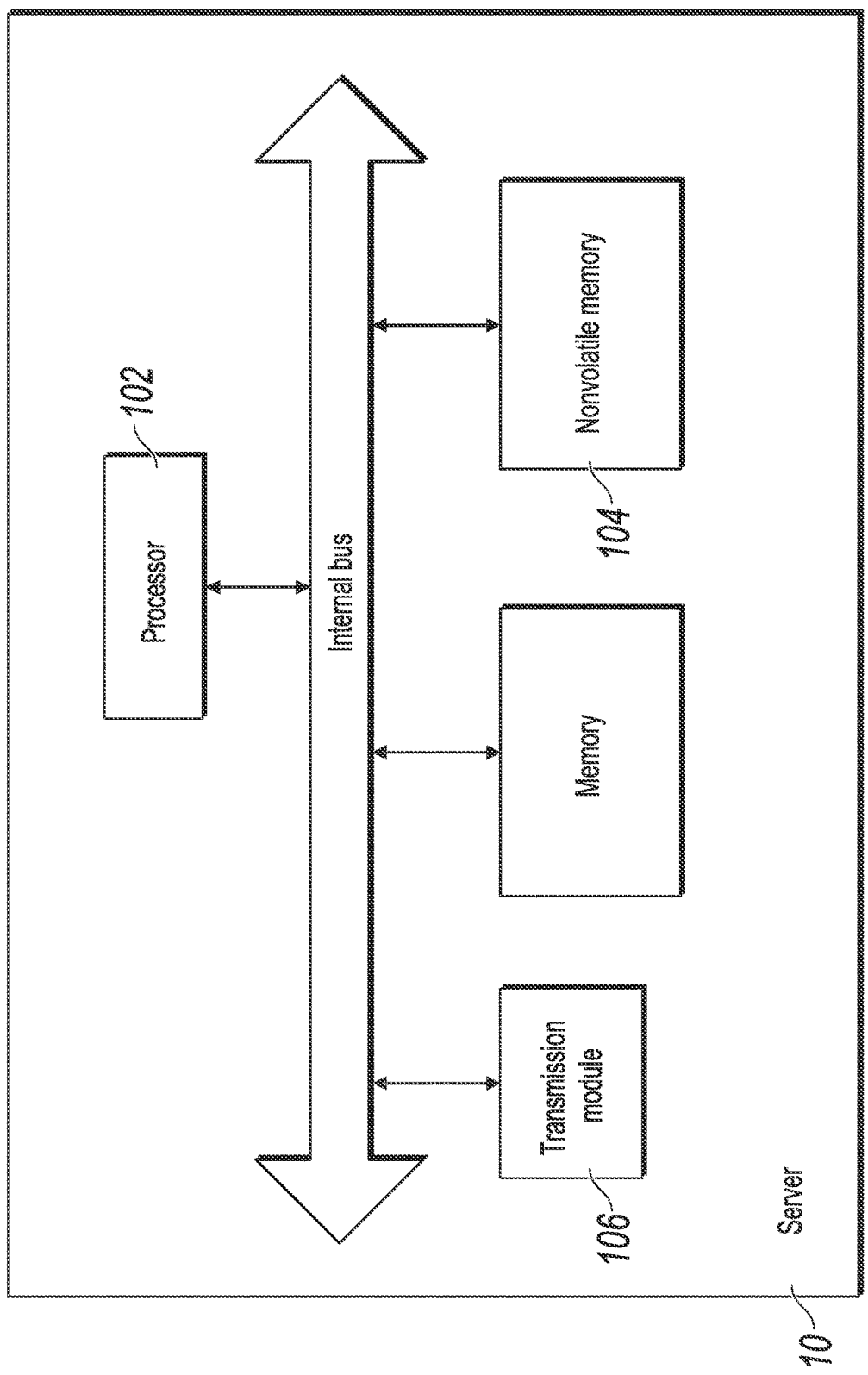
FIG. 4 is a structural block diagram illustrating hardware of a blockchain data processing device, according to an implementation of the present invention.

The method implementation provided in the implementations of the present specification can be performed by a blockchain terminal device, a blockchain server, or a similar operation apparatus. In an example, the method implementation runs on a blockchain node device (which can be a client device, a standalone server, or a server cluster). FIG. 4 is a structural block diagram illustrating hardware of a blockchain data processing device, according to an implementation of the present invention. As shown in FIG. 4, the blockchain data processing device 10 can include one or more (only one is shown in the figure) processors 102 (the processor 102 can include but is not limited to a processing apparatus such as a microprocessor MCU or a programmable logic device FPGA), a memory 104 configured to store data, and a transmission module 106 with a communication function. A person of ordinary skill in the art can understand that the structure shown in FIG. 4 is merely an example, and constitutes no limitation on a structure of the blockchain data processing device. For example, the processing device 10 can further include more or fewer components than those shown in FIG. 4, for example, can further include other processing hardware such as GPU (Graphics Processing Unit, graphics processing unit), or can have a configuration different from that shown in FIG. 4.

The memory 104 can be configured to store a software program and a module of application software, for example, a program instruction/module corresponding to a search method in an implementation of the present invention. The processor 102 executes various function applications and data processing by running the software program and the module stored in the memory 104, to implement the previous processing method for displaying content on a navigation interaction interface. The memory 104 can include a high-speed random access memory, and can further include a nonvolatile memory, for example, one or more magnetic storage apparatuses, a flash memory, or another nonvolatile solid-state memory. In some examples, the memory 104 can further include remote memories relative to the processor 102. These memories can be connected to the blockchain data processing device 10 by using a network. The network includes but is not limited to the Internet, an enterprise intranet, a local area network, a mobile communications network, and a combination thereof.

The transmission module 106 is configured to receive or send data by using a network. The network can include a wireless network provided by a communications supplier of the blockchain data processing device 10. In an example, the transmission module 106 includes a network interface controller (NIC). The network interface controller can be connected to another network device by using a base station, to communicate with the Internet. In an example, the transmission module 106 can be a radio frequency (RF) module. The transmission module 106 is configured to wirelessly communicate with the Internet.

Figure 5:
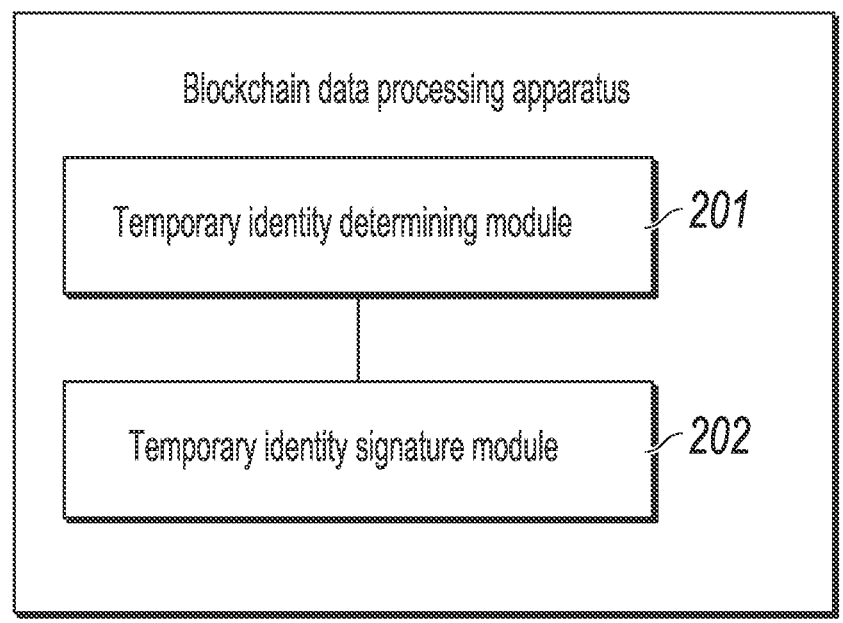
FIG. 5 is a schematic structural diagram illustrating a module in an implementation of a blockchain data processing apparatus, according to the present specification.

Based on the previous blockchain data processing method, the present specification further provides a blockchain data processing apparatus. The apparatus can include a device apparatus with reference to necessary implementation hardware and using a system (including a distributed system), software (an application), a module, a component, a server, a client device, etc. of the method in the implementations of the present specification. Based on the same creative concept, a processing apparatus in an implementation provided in the present specification is described in the following implementation. Because a problem-resolving implementation solution of the apparatus is similar to that of the method, for specific implementation of the processing apparatus in the present implementation of the present specification, reference can be made to the implementation of the method. No repeated description is provided. Although the apparatus described in the following implementation is preferably implemented by software, implementation of hardware or a combination of software and hardware is possible to conceive. As shown in FIG. 5, in an implementation, the blockchain data processing apparatus can include the following: a temporary identity determining module 201, configured to determine temporary identity information of a transaction participant in a blockchain; and a temporary identity signature module 202, configured to perform identity signature for a transaction by using the temporary identity information, to generate blockchain data of the transaction participant.

It is worthwhile to note that the processing apparatus in the present implementation of the present specification can further include other implementations based on the related descriptions in the method implementations. For a specific implementation, reference can be made to the descriptions in the method implementations. Details are omitted here for simplicity.

A device model identification method provided in an implementation of the present specification can be implemented by a processor executing a corresponding program instruction in a computer, for example, implemented at a PC end/server end by using c++/java language in a Windows/Linux operating system, implemented by hardware necessary for a programming language set corresponding to another system such as Android or iOS, or implemented based on processing logic of a quantum computer. In an implementation of implementing the previous method by a processing device provided in the present specification, the processing device can include a processor and a memory configured to store a processor executable instruction. When executing the instruction, the processor performs the following steps: determining temporary identity information of a transaction participant in a blockchain; and performing identity signature for a transaction by using the temporary identity information, to generate blockchain data of the transaction participant.

Based on the descriptions in the method implementations, in another implementation of the device, the temporary identity information includes data information generated after real identity information of the transaction participant is processed based on an asymmetric encryption algorithm.

Based on the descriptions in the method implementations, in another implementation of the device, the processor further sends a public key of the transaction participant to a specified transaction participant. Correspondingly, the processor performs identity signature for a transaction by using the temporary identity information, including the following: performing identity signature for the transaction by using a private key of the transaction participant.

Based on the descriptions in the method implementations, in another implementation of the device, the processor updates the temporary identity information based on at least one of different transaction participants and different transactions.

Based on the descriptions in the method implementations, in another implementation of the device, the processor performs the following step: updating the temporary identity information based on a predetermined replacement cycle.

Based on the descriptions in the method implementations, in another implementation of the device, the sending a public key of the transaction participant to a specified transaction participant includes the following: transmitting data by using an established end-to-end encryption channel.

Based on the descriptions in the method implementations, in another implementation of the device, the processor further performs the following step: encrypting a private key of the transaction participant by using a public key in regulation keys corresponding to a regulator, and transmitting encrypted information to the corresponding regulator.

The instruction can be stored in a plurality of computer readable storage media. The computer readable storage medium can include a physical apparatus configured to store information. The information is digitized and then stored by using media that uses an electric method, a magnetism method, an optic method, etc. The computer readable storage medium in the present implementation can include: an apparatus that stores information in the electric method, for example, various memories such as a RAM and a ROM; an apparatus that stores information in the magnetism method, for example, a hard disk, a floppy disk, a magnetic tape, a magnetic core memory, a bubble memory, or a USB flash drive; and an apparatus that stores information in the optic method, for example, a CD or a DVD. Certainly, there is a readable storage medium of other forms such as a quantum memory or a graphene memory. An instruction in the apparatus, server, client device, processing device, or system in the present implementation is described as above.

Based on the previous descriptions, an implementation of the present specification further provides a blockchain system. The system includes a blockchain terminal device and a blockchain node server. The blockchain terminal device includes at least one processor and a memory configured to store a processor executable instruction. When executing the instruction, the processor of the blockchain terminal device performs the step in any one of the implementations of the method involved with a transaction participant in the previous method implementations.

The blockchain node server is configured to store blockchain data generated based on temporary identity information.

The blockchain terminal device and the blockchain node server can be of an architecture of client device/server. In some implementation scenarios, the blockchain terminal device and the blockchain node server can be the same processing device.

It is worthwhile to note that the apparatus, processing device, terminal device, server, and system in the present implementation of the present specification can further include other implementations based on the descriptions in the related method implementations. For a specific implementation, reference can be made to the descriptions in the method implementations. Details are omitted here for simplicity.

The implementations of the present specification are described in a progressive way. For same or similar parts of the implementations, references can be made to the implementations. Each implementation focuses on a difference from the other implementations. Particularly, a hardware and program implementation is basically similar to the method implementations, and therefore is described briefly. For related parts, reference can be made to partial descriptions in the method implementations.

Specific implementations of the present specification are described above. Other implementations fall within the scope of the appended claims. In some situations, actions or steps described in the claims can be performed in a sequence different from the sequence in the implementations and the desired results can still be achieved. In addition, the process described in the accompanying drawings does not necessarily require a particular execution sequence to achieve the desired results. In some implementations, multi-tasking and parallel processing can be advantageous.

Although the present application provides the method operation steps in the implementations or the flowcharts, more or fewer operation steps can be included based on conventional or noncreative efforts. The sequence of the steps listed in the implementations is merely one of numerous step execution sequences, and does not represent the unique execution sequence. For an actual apparatus or client device product, the steps can be executed based on the method sequence illustrated in the implementations or accompanying drawings or executed in parallel (for example, an environment of parallel processors or multi-threaded processing).

Although SSL encryption communication, description of a definition of a transaction including contract creation and execution, an encryption signature by using a public key or a private key, operations such as data acquisition, definition, interaction, calculation, determining, and encryption, and data description are mentioned in the content of the implementations of the present specification, the implementations of the present specification are not limited to situations that need to comply with industry communications standards, standard asymmetric encryption algorithms, communications protocols and standard data models/templates or described in the implementations of the present specification. An implementation solution obtained by using some industry standards, or in a self-defined way, or slightly modifying the implementation described in the implementations can also be used to achieve the same, equivalent, similar, or transformed predictable implementation effects in the previous implementations. An obtained implementation that is obtained by applying a modified or transformed data acquisition, storage, determining, and processing method can still fall within an optional implementation solution range of the present specification.

In the 1990s, whether a technical improvement is a hardware improvement (for example, an improvement to a circuit structure such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, for example, the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of control logic of a memory. A person skilled in the art should also know that, in addition to implementing the controller by using the computer readable program code, logic programming can be performed on method steps to enable the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, in-vehicle human-computer interaction device, a cellular phone, a camera phone, a smartphone, a personal digital assistant, a media player, a navigation device, an email device, a game console, a tablet computer, or a wearable device, or a combination of any of these devices.

Although the implementations of the present specification provide the method operation steps in the implementations or flowcharts, more or fewer operation steps can be included based on conventional or noncreative means. The sequence of the steps listed in the implementations is merely one of numerous step execution sequences, and does not represent the unique execution sequence. For an actual apparatus or terminal device product, the steps can be executed based on the method sequence in the implementations or accompanying drawings or executed in parallel (for example, an environment of parallel processors or multi-threaded processing, or even a distributed processing environment). Terms "include", "contain", or their any other variant is intended to cover non-exclusive inclusion, so that a process, a method, an article, or a device that includes a series of elements not only includes these very elements, but also includes other elements that are not expressly listed, or further includes elements inherent to such process, method, article, or device. An element described by "includes a . . .

" further includes, without more constraints, another same or identical element in the process, method, article, or device that includes the element.

For ease of description, the previous apparatus is described by dividing the functions into various modules. Certainly, when the implementations of the present specification are implemented, function of various modules can be implemented in one or more pieces of software and/or hardware, modules that implement the same function can be implemented by using a combination of a plurality of submodules or subunits, etc. The described apparatus implementation is merely an example. For example, the unit division is merely logical function division and can be other division in actual implementation. For example, a plurality of units or components can be combined or integrated into another system, or some features can be ignored or not performed. In addition, the displayed or discussed mutual couplings or direct couplings or communication connections can be implemented by using some interfaces. The indirect couplings or communication connections between the apparatuses or units can be implemented in electronic, mechanical, or other forms.

A person skilled in the art should also know that, in addition to implementing the controller by using the computer readable program code, logic programming can be performed on method steps to enable the controller to implement the same function in forms of the logic gate, the switch, the application-specific integrated circuit, the programmable logic controller, and the built-in microcontroller. Therefore, the controller can be considered as a hardware component, and an apparatus included in the controller and configured to implement various functions can also be considered as a structure in the hardware component. Or the apparatus configured to implement various functions can even be considered as both a software module implementing the method and a structure in the hardware component.

The present invention is described with reference to the flowcharts and/or block diagrams of the method, the device (system), and the computer program product based on the implementations of the present invention. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that an apparatus for implementing a specific function in one or more processes in the flowcharts and/or in one or more blocks in the block diagrams can be generated by using the instructions executed by the computer or the processor of the another programmable data processing device.

These computer program instructions can be stored in a computer readable memory that can instruct a computer or another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto a computer or another programmable data processing device, so that a series of operation steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), and/or a non-volatile memory that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by the computing device. Based on the definition in the present specification, the computer readable medium does not include transitory computer readable media (transitory media) such as a modulated data signal and carrier.

A person skilled in the art should understand that an implementation of the present specification can be provided as a method, a system, or a computer program product. Therefore, the implementations of the present specification can use a form of hardware only implementations, software only implementations, or implementations with a combination of software and hardware. Moreover, the implementations of the present specification can use a form of a computer program product that is implemented on one or more computer-usable storage media (including but not limited to a disk memory, a CD-ROM, an optical memory, etc.) that include computer-usable program code.

The implementations of the present specification can be described in the general context of computer-executable instructions, for example, a program module. Generally, the program module includes a routine, a program, an object, a component, a data structure, etc. executing a specific task or implementing a specific abstract data type. The implementations of the present specification can alternatively be practiced in distributed computing environments in which tasks are performed by remote processing devices that are connected through a communications network. In the distributed computing environment, the program module can be located in both local and remote computer storage media including storage devices.

The implementations of the present specification are described in a progressive way. For same or similar parts of the implementations, references can be made to the implementations. Each implementation focuses on a difference from the other implementations. Particularly, a system implementation is basically similar to the method implementations, and therefore is described briefly. For related parts, reference can be made to partial descriptions in the method implementations. In the descriptions of the present specification, reference terms such as "an implementation", "some implementations", "example", "specific example", and "some examples" mean that specific features, structures, materials, or characteristics described with reference to the implementation or example are included in at least one implementation or example in the implementations of the present specification. In the present specification, the example expressions of the previous terms are not necessarily with respect to the same implementation or example. In addition, the described specific features, structures, materials, or characteristics can be combined in a proper way in any one or more of the implementations or examples. In addition, a person skilled in the art can integrate or combine different implementations or examples and characteristics of different implementations or examples described in the present specification, provided that they do not conflict with each other.

The previous descriptions are merely implementations of the implementations of the present specification, and are not intended to limit the implementations of the present specification. For a person skilled in the art, the implementations of the present specification can have various changes and variations. Any modifications, equivalent substitutions, and improvements made within the spirit and the principle of the implementations of the present specification shall fall within the scope of the claims of the implementations of the present specification.

Figure 6:
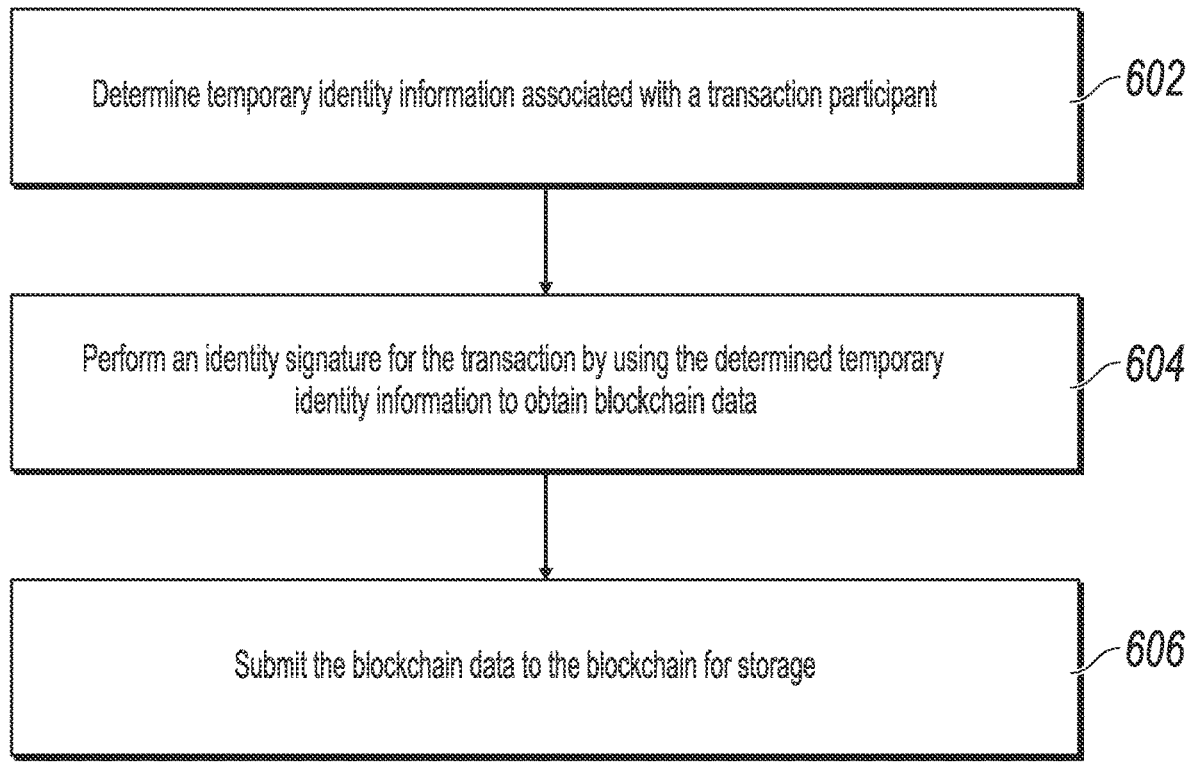
FIG. 6 is a flowchart illustrating an example of a computer-implemented method for security blockchain transactions, according to an implementation of the present disclosure.

FIG. 6 is a flowchart illustrating an example of a computer-implemented method 600 for security blockchain transactions, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, temporary identity information associated with a transaction participant is determined, where the transaction participant participates in a transaction in a blockchain. In some implementations, the temporary identity information includes data information that is generated by processing real identity information associated with the transaction participant using an asymmetric encryption algorithm. From 602, method 600 proceeds to 604.

At 604, an identity signature for the transaction is performed by using the determined temporary identity information to obtain blockchain data. From 604, method 600 proceeds to 606.

At 606, in response to performing the identity signature, the blockchain data is submitted to the blockchain for storage. In some implementations, the blockchain data is associated with a contract, and wherein the identity signature is performed during at least one of a creation, a modification, and an execution of the contract.

In some implementations, method 600 further includes prior to performing the identity signature, sending a public key associated with the transaction participant to a specified transaction participant that is involved in the transaction. In such implementations, performing the identity signature includes performing the identity signature for the transaction by using a private key corresponding to the public key.

In some implementations, the transaction participant and the specific transaction participant are registered with a blockchain platform; and where data is transmitted between the transaction participant and the specific transaction participant through an end-to-end encryption channel after the blockchain platform identifies the transaction participant and the specific transaction participant as authorized users.

In some implementations, method 600 further includes encrypting a private key associated with the transaction participant by using a public key associated with to a regulator to obtain encrypted information; and in responsive to encrypting the private key, transmitting the encrypted information to the regulator. After 606, method 600 stops.

Implementations of this specification can solve technical problems in securing blockchain data transactions. In a blockchain application, both parties involved can offline agree on contract content or contract execution, and then store related data in a blockchain. Some transaction data in a blockchain can be viewed and analyzed by another node, for example, business activities of a member are analyzed based on the number of transactions submitted to the blockchain by the member within a time period, transaction types, and transaction participants. However, the transaction data can be maliciously used in this way. What is needed is a technique to bypass these problems in the conventional methods, and providing a method that can more effectively ensure information security of transaction participants is urgently needed in a blockchain data service.

Implementation of the present application provide methods and apparatuses for improving the blockchain transactions security by using temporary information of transaction participants. According to these implementations, data information is processed by using a temporary identity before being uploaded to the blockchain for storage, so that association between transactions can be effectively removed, a transaction is difficult to be associated with a real identity, and storage security of the blockchain data can be improved. In addition, identity signature is performed by using the public key generated by using the asymmetric encryption algorithm and the temporary identity information of the transaction participant. The represented temporary identity information is random, and a real identity cannot be obtained in reverse. After the temporary identity information is stored in the blockchain, another non-transaction participant (other than an agreed party or a party with a decryption key) cannot learn of the real identity of the transaction participant. As such, the transaction is not associated with the real identity, and security of the real identity information of the user is greatly ensured Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for securing blockchain transactions, comprising:
   determining temporary identity information for a transaction participant based on first identity information that identifies the transaction participant, wherein the transaction participant participates in a first transaction in a blockchain and wherein the first transaction includes first transaction content;
   signing the first transaction using the temporary identity information to obtain first signed transaction content;
   in response to signing the first transaction, publishing the first signed transaction content for storage in the blockchain;
   generating updated temporary identity information for the transaction participant based on a predetermined replacement method;
   identifying a second transaction participated in by the transaction participant; and
   signing the second transaction using the updated temporary identity information to obtain second signed transaction content.

2. The computer-implemented method of claim 1, wherein the temporary identity information includes data that is generated by processing the first identity information using an asymmetric encryption algorithm.

3. The computer-implemented method of claim 1, wherein the data first transaction content is associated with a contract, and wherein the first transaction is signed during at least one of a creation, a modification, and an execution of the contract.

4. The computer-implemented method of claim 1, further comprising:
   prior to signing the first transaction, sending a public key associated with the transaction participant to a specified transaction participant that is involved in the first transaction.

5. The computer-implemented method of claim 4, wherein signing the first transaction includes:
   signing the first transaction by using a private key corresponding to the public key.

6. The computer-implemented method of claim 4, wherein the transaction participant and the specified transaction participant are registered with a blockchain platform; and wherein data is transmitted between the transaction participant and the specified transaction participant through an end-to-end encryption channel after the blockchain platform identifies the transaction participant and the specified transaction participant as authorized users.

7. The computer-implemented method of claim 1, further comprising:
   encrypting a private key associated with the transaction participant using a public key associated with a regulator to obtain an encrypted private key; and
   in responsive to encrypting the private key, transmitting the encrypted private key to the regulator.

8. A non-transitory, computer-readable medium storing one or more instructions executable by a computer system to perform operations comprising:
   determining temporary identity information for a transaction participant based on first identity information that identifies the transaction participant, wherein the transaction participant participates in a first transaction in a blockchain and wherein the first transaction includes first transaction content;
   signing the first transaction using the temporary identity information to obtain first signed transaction content;
   in response to signing the first transaction, publishing the first signed transaction content for storage in the blockchain;
   generating updated temporary identity information for the transaction participant based on a predetermined replacement method;
   identifying a second transaction participated in by the transaction participant; and
   signing the second transaction using the updated temporary identity information to obtain second signed transaction content.

9. The non-transitory, computer-readable medium of claim 8, wherein the temporary identity information includes data that is generated by processing the first identity information using an asymmetric encryption algorithm.

10. The non-transitory, computer-readable medium of claim 8, wherein the first transaction content is associated with a contract, and wherein the first transaction is signed during at least one of a creation, a modification, and an execution of the contract.

11. The non-transitory, computer-readable medium of claim 8, wherein the operations further comprise:
    prior to signing the first transaction, sending a public key associated with the transaction participant to a specified transaction participant that is involved in the first transaction.

12. The non-transitory, computer-readable medium of claim 11, wherein signing the first transaction includes:
    signing the first transaction by using a private key corresponding to the public key.

13. The non-transitory, computer-readable medium of claim 11, wherein the transaction participant and the specified transaction participant are registered with a blockchain platform; and wherein data is transmitted between the transaction participant and the specified transaction participant through an end-to-end encryption channel after the blockchain platform identifies the transaction participant and the specified transaction participant as authorized users.

14. The non-transitory, computer-readable medium of claim 8, wherein the operations further comprise:
    encrypting a private key associated with the transaction participant using a public key associated with a regulator to obtain an encrypted private key; and
    in responsive to encrypting the private key, transmitting the encrypted private key to the regulator.

15. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
       determining temporary identity information for a transaction participant based on first identity information that identifies the transaction participant, wherein the transaction participant participates in a first transaction in a blockchain and wherein the first transaction includes first transaction content;
       signing the first transaction using the temporary identity information to obtain first signed transaction content;
       in response to signing the first transaction, publishing the first signed transaction content for storage in the blockchain;

generating updated temporary identity information for the transaction participant based on a predetermined replacement method;

identifying a second transaction participated in by the transaction participant; and signing the second transaction using the updated temporary identity information to obtain second signed transaction content.

16. The computer-implemented system of claim 15, wherein the temporary identity information includes data that is generated by processing the first identity information using an asymmetric encryption algorithm.

17. The computer-implemented system of claim 15, wherein the first transaction content is associated with a contract, and wherein the first transaction is signed during at least one of a creation, a modification, and an execution of the contract.

18. The computer-implemented system of claim 17, wherein the transaction participant and the specified transaction participant are registered with a blockchain platform; and wherein data is transmitted between the transaction participant and the specified transaction participant through an end-to-end encryption channel after the blockchain platform identifies the transaction participant and the specified transaction participant as authorized users.

19. The computer-implemented system of claim 15, the operations further comprising:

prior to signing the first transaction, sending a public key associated with the transaction participant to a specified transaction participant that is involved in the first transaction.

20. The computer-implemented system of claim 19, wherein signing the first transaction includes:

performing the identity signature for the transaction by using a private key corresponding to the public key.

* * * * *

UNITED STATES PATENT AND TRADEMARK OFFICE
CERTIFICATE OF CORRECTION

Page 1 of 1

PATENT NO. : 10,567,174 B2
APPLICATION NO. : 16/409420
DATED : February 18, 2020
INVENTOR(S) : Wang et al.

It is certified that error appears in the above-identified patent and that said Letters Patent is hereby corrected as shown below:

In the Claims

Column 21/Line 28 – Claim 3, after "the" delete "data".

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*